United States Patent
Bujak et al.

(10) Patent No.: US 6,971,060 B1
(45) Date of Patent: Nov. 29, 2005

(54) SIGNAL-PROCESSING BASED APPROACH TO TRANSLATION OF WEB PAGES INTO WIRELESS PAGES

(75) Inventors: Michal Bujak, San Francisco, CA (US); Drea Edward Thomas, Menlo Park, CA (US)

(73) Assignee: Openwave Systems Inc., Redwood City, CA (US)

( * ) Notice: Subject to any disclaimer, the term of this patent is extended or adjusted under 35 U.S.C. 154(b) by 832 days.

(21) Appl. No.: 09/873,063

(22) Filed: May 31, 2001

Related U.S. Application Data

(60) Provisional application No. 60/267,618, filed on Feb. 9, 2001.

(51) Int. Cl.[7] .............................................. G06F 17/00
(52) U.S. Cl. ................... 715/501.1; 715/513; 382/260; 382/262; 382/263; 382/264
(58) Field of Search ............................ 715/501.1, 513, 715/523; 382/168, 169, 260, 262–264, 265, 382/272, 273–274

(56) References Cited

U.S. PATENT DOCUMENTS

| | | | | |
|---|---|---|---|---|
| 5,970,219 A | * | 10/1999 | Nakamura | 358/1.15 |
| 6,182,092 B1 | * | 1/2001 | Francis et al. | 715/513 |
| 6,233,452 B1 | | 5/2001 | Nishino | |
| 6,356,543 B2 | | 3/2002 | Hall et al. | |
| 6,463,440 B1 | * | 10/2002 | Hind et al. | 707/102 |
| 6,470,306 B1 | * | 10/2002 | Pringle et al. | 704/3 |
| 6,507,856 B1 | * | 1/2003 | Chen et al. | 715/513 |
| 6,535,896 B2 | * | 3/2003 | Britton et al. | 715/523 |
| 6,549,674 B1 | * | 4/2003 | Chui et al. | 382/240 |
| 6,670,968 B1 | * | 12/2003 | Schilit et al. | 715/760 |
| 6,674,904 B1 | * | 1/2004 | McQueen | 382/199 |
| 6,683,983 B1 | * | 1/2004 | Shen et al. | 382/168 |
| 2002/0059333 A1 | * | 5/2002 | Tribbeck | 707/500 |
| 2002/0059334 A1 | * | 5/2002 | Jelbert | 707/500 |
| 2002/0059335 A1 | * | 5/2002 | Jelbert | 707/500 |
| 2002/0059344 A1 | * | 5/2002 | Britton et al. | 707/513 |
| 2002/0069218 A1 | * | 6/2002 | Sull et al. | 707/501.1 |
| 2002/0087327 A1 | * | 7/2002 | Lee et al. | 704/270.1 |
| 2002/0099829 A1 | * | 7/2002 | Richards et al. | 709/227 |
| 2002/0143821 A1 | * | 10/2002 | Jakubowski | 707/522 |
| 2003/0097475 A1 | * | 5/2003 | York | 709/246 |

\* cited by examiner

Primary Examiner—William Bashore
Assistant Examiner—Paul Nguyen-Ba
(74) Attorney, Agent, or Firm—Blakely, Sokoloff, Taylor & Zafman LLP

(57) ABSTRACT

A method and apparatus for transforming a web page that contains main content and auxiliary data. The web page is converted into a string containing multiple first values and multiple second values. The first values correspond to formatting code segments within the web page and the second values correspond to text segments within the web page. Further, a low-pass filter is applied to the string containing multiple first values and multiple second values, and the output of the low-pass filter is used to determine the location of the main content within the web page.

39 Claims, 9 Drawing Sheets

US 6,971,060 B1

SIGNAL-PROCESSING BASED APPROACH TO TRANSLATION OF WEB PAGES INTO WIRELESS PAGES

RELATED APPLICATIONS

This application is related to and claims the benefit of U.S. Provisional Application No. 60/267,618 entitled, "SIGNAL-PROCESSING APPROACH TO WEB TO WIRELESS PAGE TRANSLATION," filed on Feb. 9, 2001, the disclosure of which is hereby incorporated herein by reference.

FIELD OF THE INVENTION

The present invention pertains to the field of data communications. In particular, the present invention relates to techniques for translating web pages into pages viewable on mobile devices using a signal-processing based approach.

BACKGROUND OF THE INVENTION

With the growing popularity of wireless Internet, the demand for presenting a wide variety of existing web pages on mobile or portable devices such as wireless telephones, pagers, and personal data assistants (PDA) is a compelling need. However, among a vast quantity of web pages accessible over the Internet, there are only a few web pages, which are specifically designed for mobile or portable devices. The majority of web pages existing today are written in Hypertext Markup Language (HTML) which cannot be rendered by many portable devices. For example, typical wireless telephones can only access pages written in Wireless Markup Language (WML) or Handheld Device Markup Language (HDML). Accordingly, in order to display an existing HTML page on a portable device, this HTML page needs to be transformed into a WML page or HDML page that is viewable on the portable device.

One of the most challenging problems in transforming an HTML page is separating the main content included in the HTML page from auxiliary HTML data that surrounds the main content. The main content includes meaningful information that should be displayed to users of mobile devices. For example, in a news web page, the main content includes the news story, together with its title and/or headline. The auxiliary HTML data may include formatting code embedded in the text and some text segments that are not a part of the main content. The formatting code (also known as markup tags) may be used, for example, to define the page layout, fonts and graphic elements, as well as the hypertext links to other documents on the Internet. The auxiliary text segments include information that does not need to be displayed to the users of mobile devices (e.g., text in the header of the page, navigation links, inset boxes with text, etc.).

A typical HTML page includes alternating markup tag segments and text segments. Because portable devices do not understand HTML, the markup tags need to be removed from the HTML page when transforming the HTML page into a WML or HDML page. In addition, the auxiliary text segments need to be separated from the main content. However, since HTML is fundamentally a formatting language, no semantic information exists to define the content of the text segments on an HTML page. For example, a block of data that looks like "<b>xxxxxx</b>" might be a date, an author, a headline, or an advertisement, and there is no mechanism to determine the content of this block of data without a human reading it. As a result, it is difficult to identify the portions of the HTML page that need to be marked up for display on a mobile device.

SUMMARY OF THE INVENTION

The present invention includes a method and apparatus for transforming a web page that contains main content and auxiliary data. The web page is converted into a string containing multiple first values and multiple second values. The first values correspond to formatting code segments within the web page and the second values correspond to text segments within the web page. Further, a low-pass filter is applied to the string containing multiple first values and multiple second values, and the output of the low-pass filter is used to determine the location of the main content within the web page.

Other features of the present invention will be apparent from the accompanying drawings and from the detailed description which follows.

BRIEF DESCRIPTION OF THE DRAWINGS

The present invention is illustrated by way of example and not limited by the figures of the accompanying drawings, in which like references indicate similar elements and in which.

DETAILED DESCRIPTION

Figure 1:
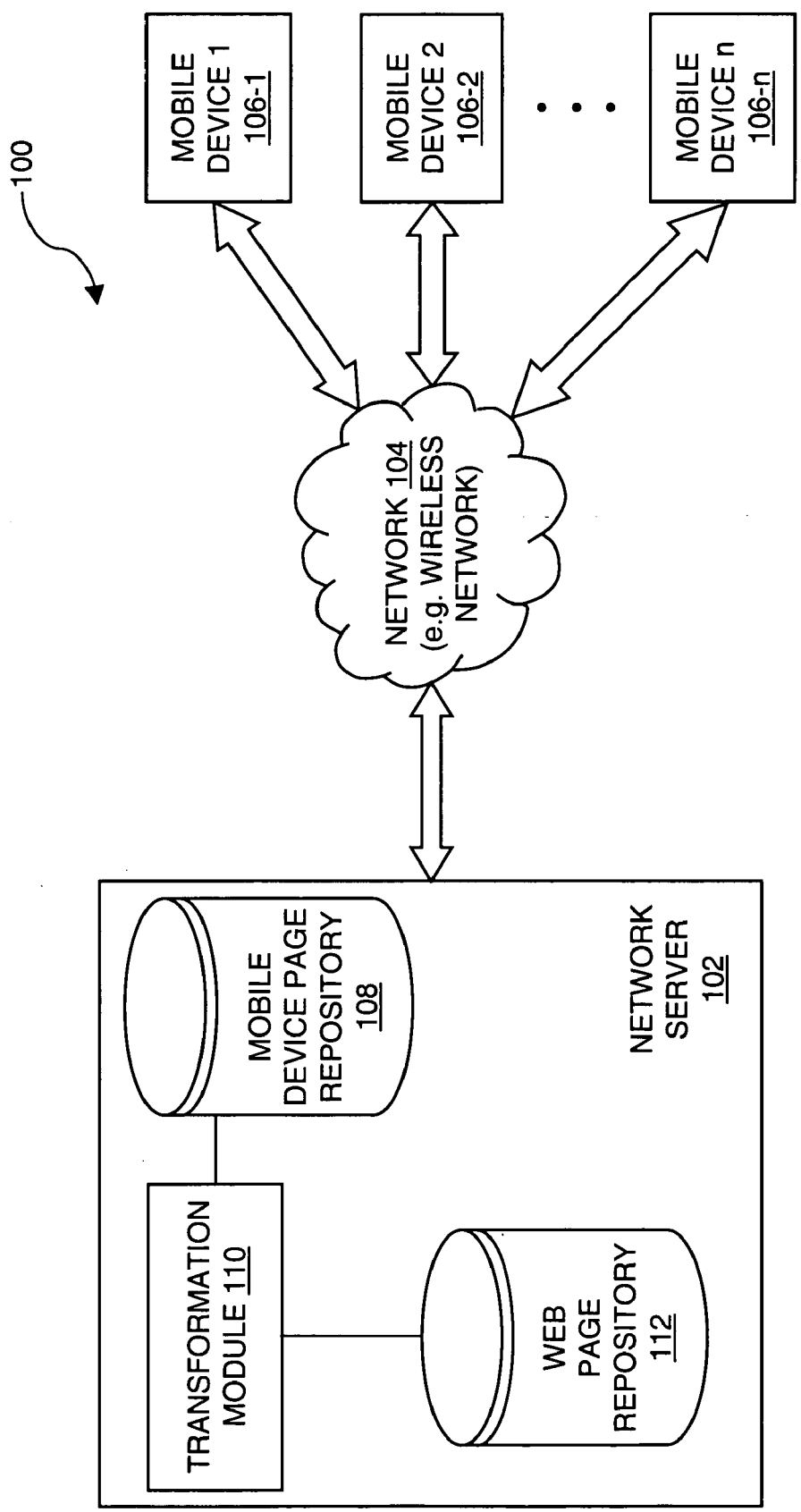
FIG. 1 illustrates a system in which the present invention may be practiced.

A method and apparatus for transforming web pages into pages viewable on mobile devices are described. In the following description, for purposes of explanation, numerous specific details are set forth in order to provide a thorough understanding of the present invention. It will be apparent, however, to one skilled in the art that the present invention can be practiced without these specific details.

The present invention relates to apparatus for performing the operations described herein. This apparatus may be specially constructed for the required purposes, or it may comprise a general purpose computer selectively activated or reconfigured by a computer program stored in the computer. Such a computer program may be stored in a computer readable storage medium, such as floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions. Instructions are executable using one or more processing devices (e.g., microprocessors, central processing units, etc.).

The algorithms and displays presented herein are not inherently related to any particular computing platform or other apparatus. Various general-purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

In the following description, references to "one embodiment" or "an embodiment" mean that the feature being referred to is included in at least one embodiment of the present invention. Furthermore, separate references to "one embodiment" in this description do not necessarily refer to the same embodiment, however, neither are such embodiments mutually exclusive, unless so stated and except as will be readily appreciated by those skilled in the art.

The present invention relates to various aspects of transforming web pages such as, for example, pages written in Hypertext Markup Language (HTML), dynamic HTML, extensible HTML (XHTML) and extensible markup language (XML), into pages viewable on mobile devices. Mobile devices referred to herein include wireless telephones, pagers, personal digital assistants (PDA), or other Internet-capable portable devices. A typical web page contains alternating formatting code segments and text segments. Because mobile devices do not understand such markup languages as HTML, dynamic HTML, XHTML and XML, the formatting code segments should be discarded when the web page is transformed into a mobile device page. Each text segment may be either a part of the main content or auxiliary data. The main content includes meaningful information that needs to be displayed to a user of a mobile device. For example, the main content may include a news story, together with its title and/or headline. Auxiliary text segments may include text in the page header, footer or sidebars, navigational links, inset boxes with text, etc. Typically, the main content is included in the largest reasonably contiguous text segment on the web page, and the auxiliary text data is included in smaller text segments. As described in greater detail below, the transformation technique of the present invention determines the location of the main content within the web page using a signal-processing approach.

The transformation technique described herein converts an existing web page into a string containing multiple first values and multiple second values. The first values correspond to formatting code segments within the web page and the second values correspond to text segments within the web page. In one embodiment, a value of zero (0) is assigned to each character of a formatting code segment and a value of one (1) is assigned to each character of a text segment. In an alternative embodiment, the second values may vary for different text segments depending on the weight associated with each text segment. For example, the value for a text segment within a <h1> tag may be increased because this text segment has a high likelihood of being a story title and as such should be included in a mobile device page.

Further, a low-pass filter is applied to the string containing multiple first and second values, and the low-pass filter output is used to determine the location of the main content within the web page. The main content is then coded in a mobile device markup language (e.g., Wireless Markup Language (WML) or Handheld Device Markup Language (HDML)) for display on the mobile device.

In one embodiment, the low-pass filter is a moving average filter, which generates an output representing the distribution of text density over the web page. This output is then searched to find the position of the central peak that corresponds to the highest density of text within the web page. Using the position of the highest text density and a threshold text density value, the beginning and ending of a high text density area are located. The content of this area is then further transformed into a mobile device page.

In an alternative embodiment, two low-pass filters are used to locate the main content within the web page. Specifically, a median filter is applied to the string containing multiple first and second values to suppress high frequency signal oscillations associated with the string. Next, a moving average filter is applied to the median filter output to combine closely spaced text segments contained in this output into a set of larger text segments. The output of the moving average filter is then passed through a rising and falling edge detector to identify the largest reasonably contiguous text segment in the moving average filter output. Further, the content of the largest text segment is coded in a mobile device markup language for display on a mobile device.

FIG. 1 illustrates a system 100 in which the present invention may be practiced. Referring to FIG. 1, system 100 includes a network server 102, network 104, and n mobile devices 1 through n (106-1 to 106-n) coupled to network server 102 via network 104. Mobile devices 106 are interactive two-way communication devices. For example, mobile devices 106 may be wireless telephones, palm-sized computing devices, PDAs, Internet-capable appliance remote controllers or a combination of such devices. Such two-way communication devices may communicate wirelessly with network server 102 via wireless network 104. A wide variety of communication techniques known in the art can be used to enable communication between network server 102 and mobile devices 106.

In one embodiment, network server 102 includes a web page repository 112. Alternatively, web page repository 112 resides on a different computer(s) and is accessible by network server 102.

Repository 112 contains various web pages that are designed for web browsers such as HTML browsers, rather than mobile devices 106. The web pages in repository 112 are written in markup languages such as HTML, dynamic HTML, XHTML, XML, etc. These web pages cannot be viewed on mobile devices 106 unless they are transformed into mobile device pages (e.g., WML pages, HDML pages, Nok_WML pages, etc). In one embodiment, network server 102 includes a transformation module 110 coupled to web page repository 112. Transformation module 110 is responsible for transforming web pages (e.g., HTML pages, XHTML pages, XML page, etc.) from repository 112 and other external sources into mobile device pages (e.g., WML pages, HDML pages, etc.). Mobile device pages may be stored in a mobile device page repository 108. In one embodiment, repositories 108 and 112 are combined into one data repository (e.g., a single database).

The transformation is performed by locating the main content within a web page using a signal-processing approach described in greater detail below and then coding this content in a mobile device markup language to make it viewable on mobile devices 106. In one embodiment, transformation module 110 translates web pages (e.g., static HTML pages) once they are added to repository 112 and stores the transformed pages in repository 108. In another embodiment, transformation module 110 translates web pages (e.g., static HTML pages or dynamic XML pages) upon receiving corresponding requests from mobile phones 106. The web pages may be retrieved from repository 112 or various outside sources. The transformed pages may or may not be stored in repository 108.

Figure 2:
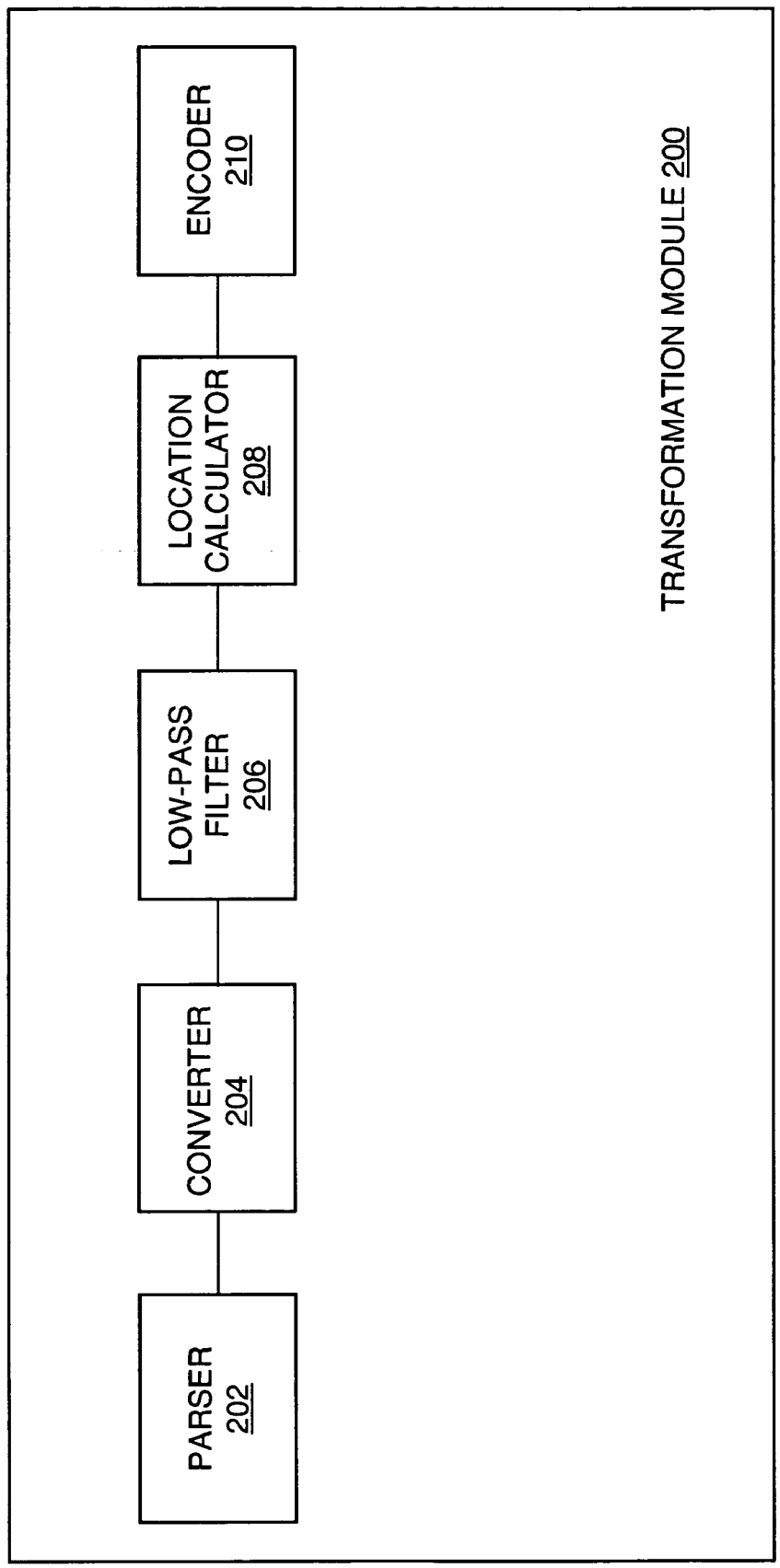
FIG. 2 is a block diagram of one embodiment of a transformation module.

FIG. 2 is a block diagram of one embodiment of a transformation module 200. Transformation module 200 includes a converter 204, a low-pass filter 206 and a location calculator 208. Converter 204 is responsible for converting a web page being transformed into a string containing multiple first values (e.g., multiple 0s) and multiple second values (e.g., multiple 1s). First values correspond to formatting code segments in the web page and second values correspond to text segments in the web page. In one embodiment, transformation module 200 includes a parser 202 which identifies formatting code segments and text segments within the web page. In one embodiment, converter 204 assigns a value of 0 to each character within the formatting code segments and a value of 1 to each character within the text segment. Alternatively, the assigned second values may vary depending on the weight associated with each text segment, as will be described in more detail below.

Low-pass filter 206 is applied to the string generated by converter 204. In one embodiment, filter 206 is a moving average filter, which generates the output representing the distribution of text density over the web page. Location calculator 208 is then responsible for determining location of the main content within the web page using the output of filter 208. In one embodiment, location calculator 208 searches the output of filter 208 to find the position of the central peak, which corresponds to the highest text density within the web page. Based on the position of the central peak and a threshold text density value, location calculator 208 can determine starting and ending positions of the high text density area, which contains the main content of the web page.

In an alternative embodiment, filter 206 includes a median filter and a moving average filter. The median filter is applied to the string generated by converter 204 to suppress high frequency signal oscillations associated with the string. The moving average filter is applied to the output of the median filter to combine closely spaced text segments within the median filter output into a set of larger text segments. Location calculator 208 then uses the moving average filter output to determine the location of the largest text segment, which corresponds to the main content of the web page. In one embodiment, location calculator 208 includes a rising and falling edge detector, which identifies the largest reasonably contiguous text segment in the moving average filter output. The largest text segment corresponds to the main content of the web page.

Encoder 210 is responsible for coding the main content of the web page in a mobile device markup language for display on the mobile device.

Figure 3:
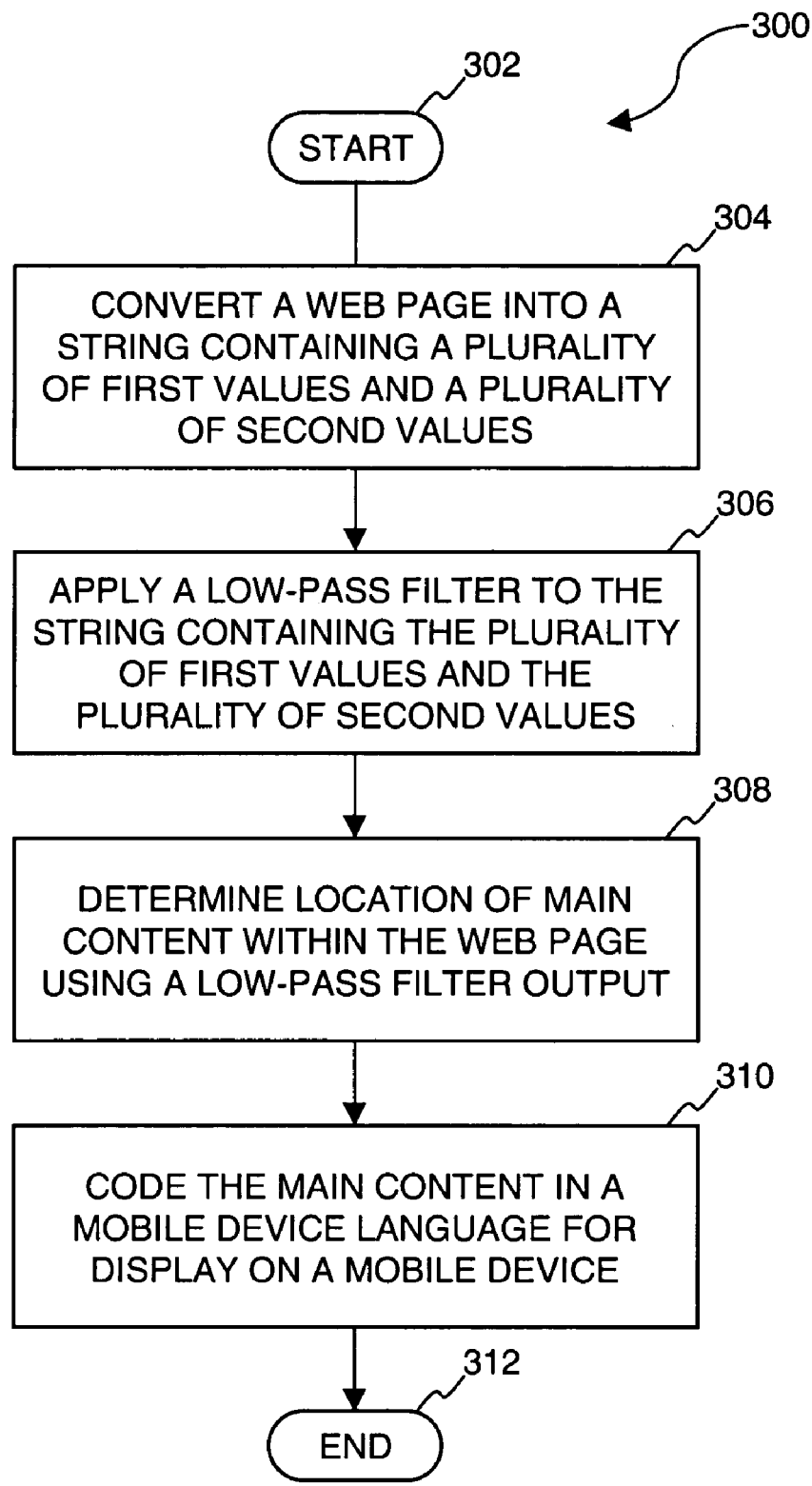
FIG. 3 is a flow diagram of a process for transforming a hypermedia document into a document viewable on a mobile device, according to one embodiment of the present invention.

FIG. 3 is a flow diagram of a process 300 for transforming a hypermedia document into a document viewable on a mobile device, according to one embodiment of the present invention. Process 300 begins with converting a hypermedia document such as a web page into a string containing multiple first values and multiple second values at processing block 304. First values correspond to formatting code segments within the web page, and second values correspond to text segments within the web page. A web page may be a file written in HTML, dynamic HTML, XHTML, XML, JavaScript, Visual Basic (VB) Script, or any other language used for coding web pages that cannot be rendered by mobile devices. As described above, a web page contains main content and auxiliary data. In one embodiment, a corresponding value is assigned to each character within the formatting code segments and text segments, as will be described in greater detail below.

At processing block 306, a low-pass filter is applied to the string containing multiple first and second values. In one embodiment, the low-pass filter is a moving average filter, which generates the output representing the distribution of text density over the web page, as will be described in greater detail below in conjunction with FIGS. 4, 6 and 7. In another embodiment, the low-pass filter includes a median filter suppressing high frequency signal oscillations associated with the string, and a moving average filter combining closely spaced text segments within the median filter output into a set of larger text segments, as will be described in more detail below in conjunction with FIGS. 5, 8, 9 and 10.

At processing block 308, the location of the main content within the web page is determined based on the low-pass filter output. In one embodiment, a threshold text value is used to determine the starting and ending positions of the main content. In one embodiment, the threshold text value as well as other threshold values described herein is determined by experimenting with a large number of web pages.

At processing block 310, the main content is encoded in a mobile device markup language for display on the mobile device.

Figure 4:
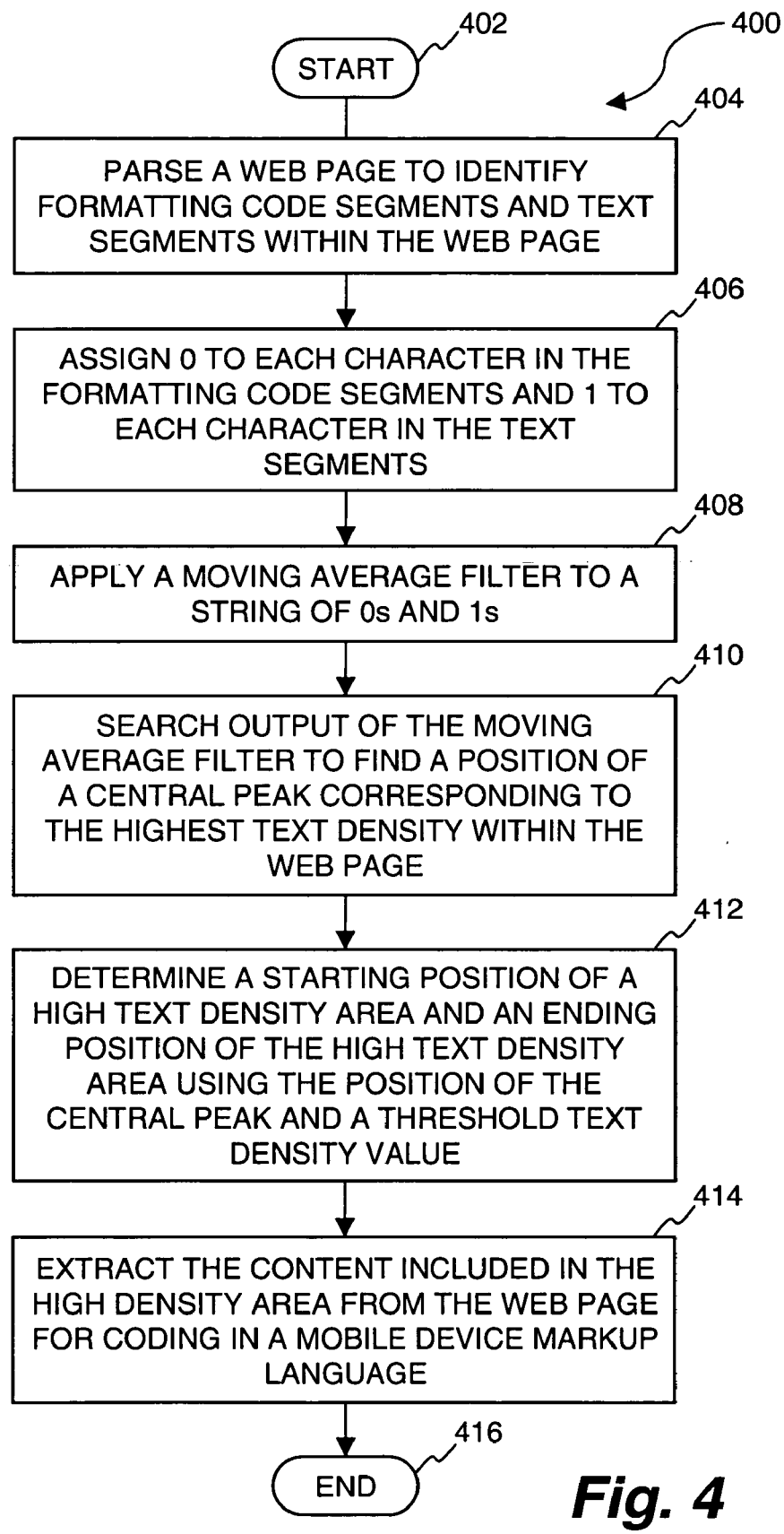
FIG. 4 is a flow diagram of a process for determining location of main content in a web page using text density within the web page, according to one embodiment of the present invention.

FIG. 4 is a flow diagram of a process 400 for determining location of main content in a web page based on the distribution of text density over the web page, according to one embodiment of the present invention. Process 400 begins with parsing a web page to identify formatting code segments and text segments within the web page at processing block 404. At processing block 406, each character in the formatting code segments is assigned a value of 0. In addition, in one embodiment, each character in the text code segments is assigned a value of 1. Alternatively, values assigned to characters within the text segments vary depending on the weight associated with each text segment. The weight indicates the likelihood of including a particular text segment into the content that needs to be displayed to the users of mobile devices. For instance, a text segment that has the font style other than regular (e.g., bold or italic) may be given more weight because it is more likely that this text segment is a part of the main content. Similarly, a text segment that has the font size larger than the rest of the text in the web page or is marked as a heading (e.g., <h1>, <h2>, etc.) may have stronger weighting. When a text segment has stronger weighting, the values assigned to this text segment are increased. Alternatively, a text segment may be given less weight if this text segment has a high likelihood of being a part of auxiliary data within the web page. One example of such a text segment is the text within the <script></script> tag. This text represents executable code that only functions on an HTML browser.

Long tags may reduce the average weight of the text that they surround. In one embodiment, the number of 0s assigned to a formatting code segment is reduced when the length of the formatting code segment exceeds a threshold tag length value, thereby raising the average weight of the text embedded within the formatting code segments. For example, in HTML a link may be included within an <a href=" "></a> tag. While the text within the link may be relevant, it can be very short compared to the absolute URL specified within the <a> tag.

Figure 6:
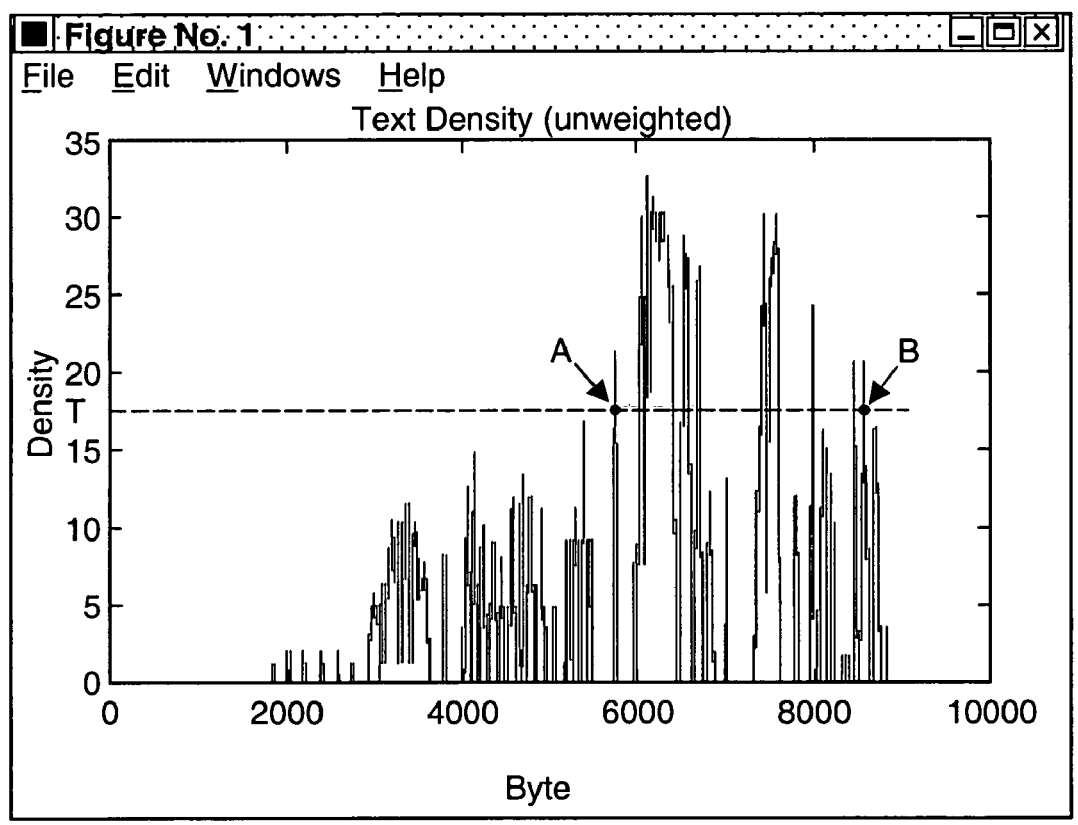
FIGS. 6–10 illustrate graphical representations of low-pass filter outputs used to locate main content within a web page.
Figure 7:
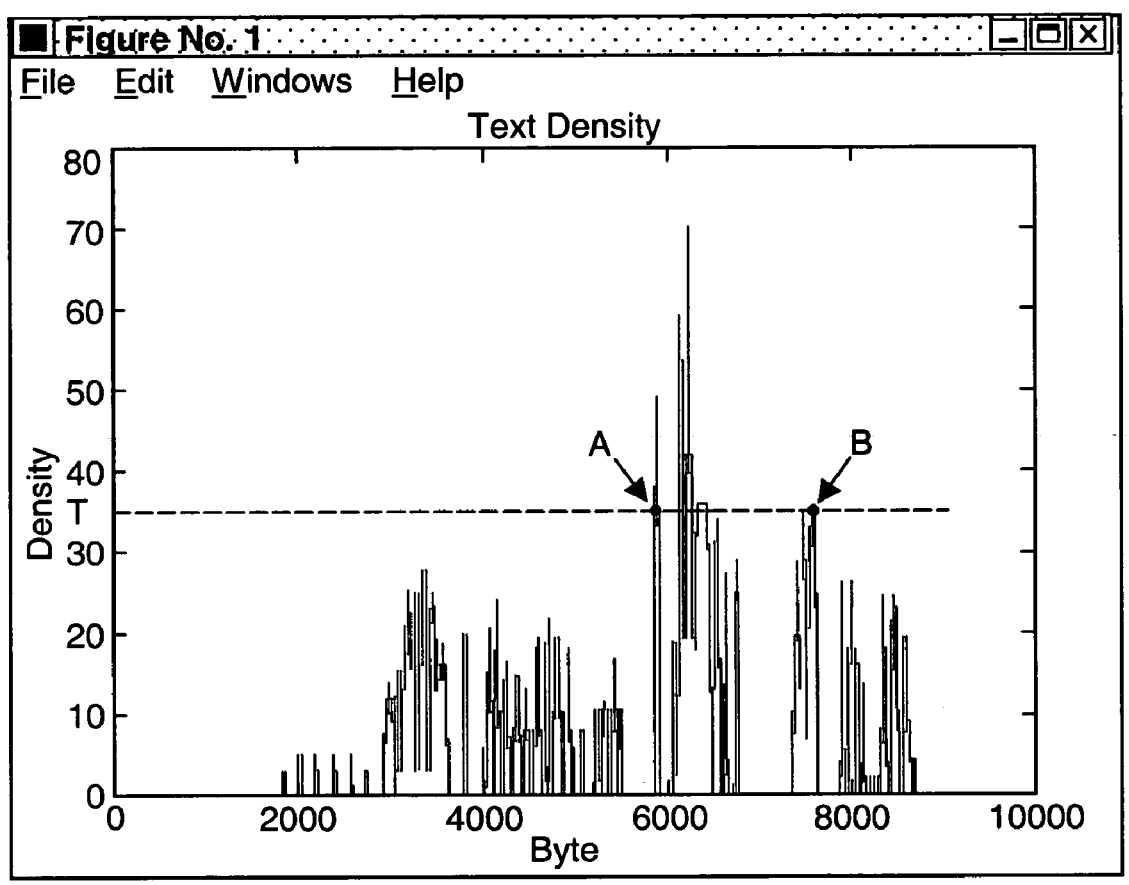

At processing block 408, a moving average filter is applied to a string containing 0s and 1s (and values higher than 1 if the text segments are weighted). The output of the moving average filter represents the distribution of density over the web page. FIGS. 6 and 7 illustrate exemplary outputs of the moving average filter.

Referring to FIG. 6, the output is a graph produced by performing a 36 point wide moving average on a string of 0s and 1s, without using the weighting approach described above. The graph illustrates text density at each byte of the web page. Referring to FIG. 7, the graph is produced by performing a 36 point wide moving average on a weighted web page. Weighting may greatly improve the accuracy of locating the main content within the web page.

Returning to FIG. 4, at processing block 410, the output of the moving average filter is used to find the position of the central peak that corresponds to the highest text density within the web page. At processing block 412, the output of the moving average filter is searched for starting and ending positions of the high density area. In one embodiment, a threshold text density value is used to locate these starting and ending positions. As illustrated in FIGS. 6 and 7, processing of the web page is done byte by byte from left to right until threshold text density T is reached. The first point that exceeds threshold T represents starting position A of the high-density area. The last point on the graph that exceeds threshold T represents ending position B of the high-density area.

At processing block 414, the content included between positions A and B is extracted from the web page and coded in a mobile device markup language.

Figure 5:
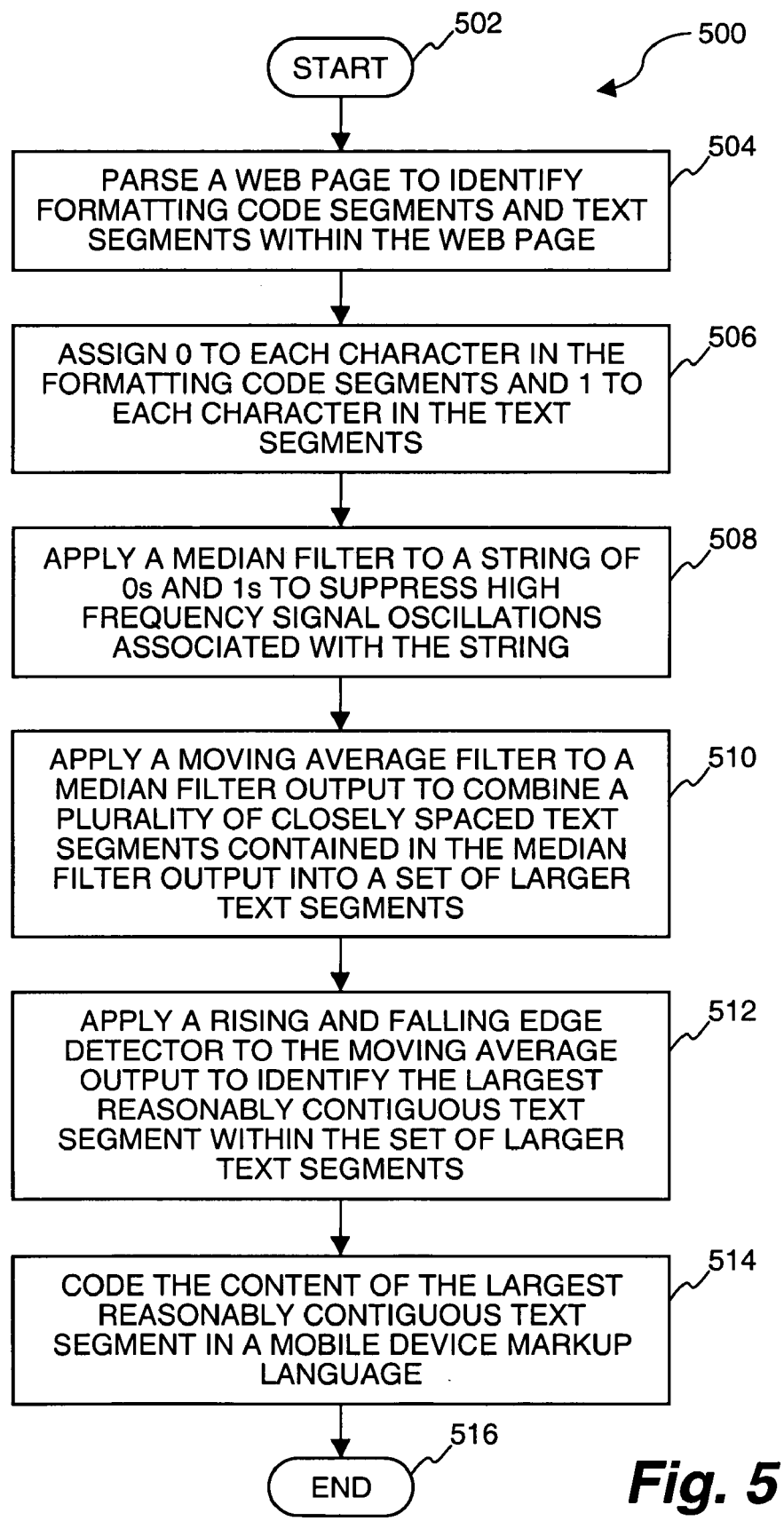
FIG. 5 is a flow diagram of a process for determining location of main content in a web page based on the width of text segments, according to one embodiment of the present invention.
Figure 8:
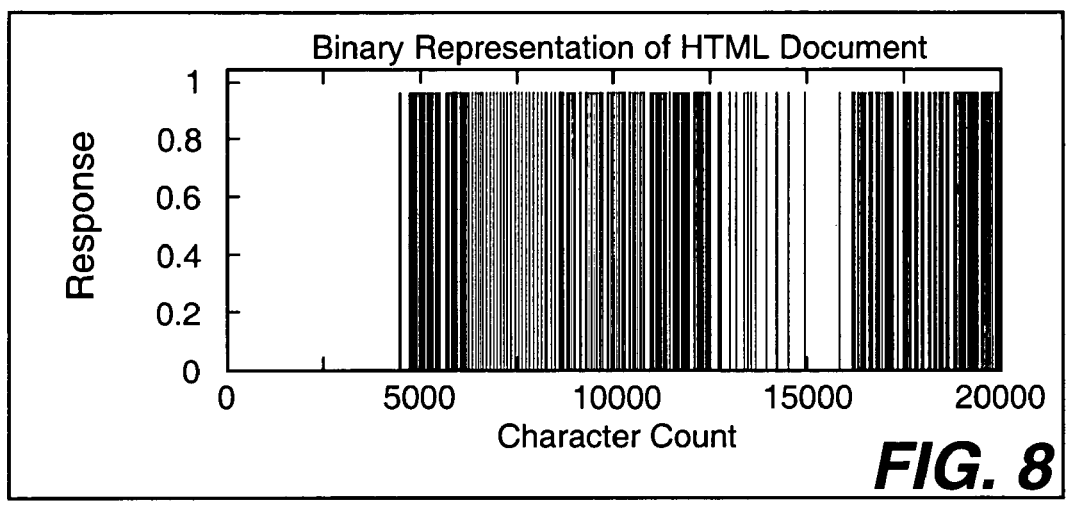

FIG. 5 is a flow diagram of a process 500 for determining location of main content in a web page based on the width of text segments, according to one embodiment of the present invention. Process 500 begins with parsing a web page to identify formatting code segments and text segments within the web page at processing block 504. At processing block 506, each character in the formatting code segments is assigned a value of 0. In addition, in one embodiment, each character in the text code segments is assigned a value of 1. FIG. 8 illustrates a binary representation of an HTML web page, demonstrating the high frequency oscillations associated with the resulting string of 0s and 1s.

In an alternative embodiment, values assigned to characters within the text segments may vary depending on the weight associated with each text segment, as described in more detail above.

In one embodiment, the number of 0s assigned to a formatting code segment is reduced when the length of the formatting code segment exceeds a threshold tag length value, as described in greater detail above.

Figure 9:
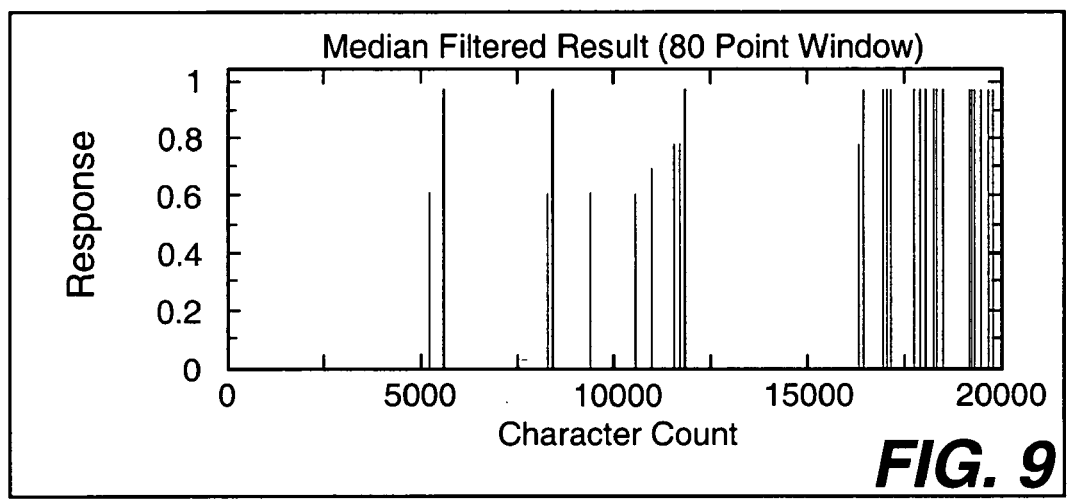

At processing block 508, a median filter is applied to the string containing 0s and 1s (and values higher than 1 if the text segments are weighted) to suppress high frequency signal oscillations associated with the string. FIG. 9 illustrates an exemplary output of the median filter.

Referring to FIG. 9, the median filter output is a graph representing alternating formatting code segments and text segments in the web page after short text segments have been suppressed using the median filter with an 80-point wide window.

In one embodiment, the signal to be filtered by the median filter can be defined as $X[n]$ where $n=[0, N-1]$ and N is the number of bytes contained in the web page. The resulting signal can be defined as $Y[n]$. The window width of the median filter can be defined as $W_m$. At each point m, the value of the resulting signal $Y[m]$ is computed by ordering input signal values $X[m-W_m/2], \ldots, X[m+W_m/2]$ in increasing order. At each point, the output signal value $Y[m]$ is equal to the value in the middle of this ordered sequence. The median filter needs to know all values of the initial signal between $X[m-W_m/2]$ and $X[m+W_m/2]$ before the output signal value $Y[m]$ can be computed. This introduces a delay of $W_m/2$. In addition, at the edges of the signal X, where there is no symmetric window of width $W_m$, the size of the window on the side that does not have enough values X of the initial signal is reduced to match the number of available values X. In one embodiment, the median filter is optimized to provide the additional computation time per output point of order $\{\log(W_m)\}$.

Median filtering results in suppressing the large variations that can exist at the end points of the ordered sequence of the input signal values X.

Figure 10:
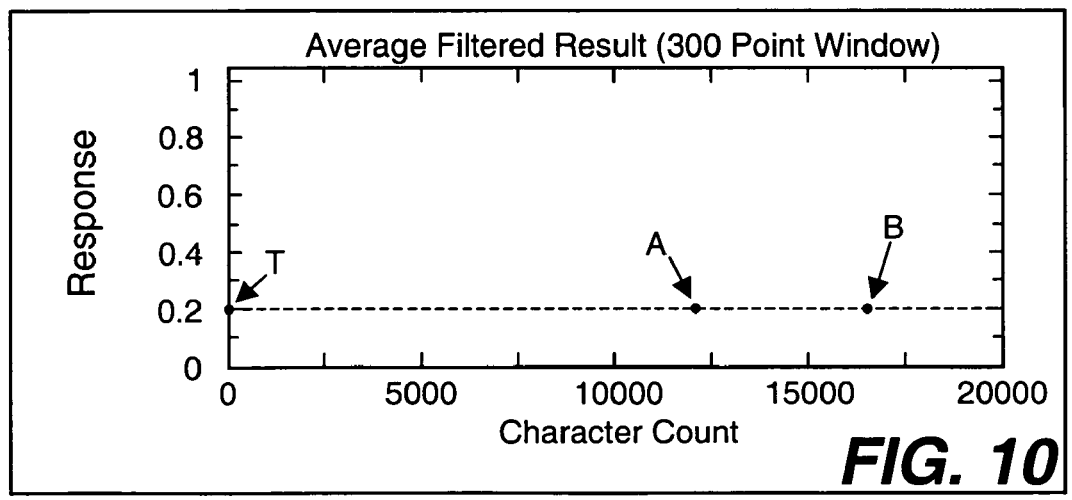

Returning to FIG. 5, at processing block 510, a moving average filter is applied to the median filter output to combine a plurality of closely spaced text segments into a set of larger text segments. FIG. 10 illustrates an exemplary output of the moving average filter.

Referring to FIG. 10, a graph containing a set of larger text segments is produced by passing the median filter signal through a 300-point averaging filter.

In one embodiment, the moving average filter operates on a signal X, by applying an averaging window of $W_a$ points wide (similarly to the operation of the median filter described above). The input signal can be defined as $X[n]$ where $n=[0, N-1]$ and N is the number of bytes contained in the web page. The resulting signal can be defined as $Y[n]$. At each point m, the value of the resulting signal $Y[m]$ is the average value of input signal values $X[m-W_a/2], \ldots, X[m+W_a/2]$. In one embodiment, the moving average filter is optimized to provide the additional computation time per output point of order $\{1\}$.

The moving average filter gathers together multiple text segments into a single block. For instance, there may be some formatting code between the text segment representing the title of the news story and the text segment containing the story itself, making it appear that these are two distinct features. The moving average filter combines the two features into a one single block if the two features are located close to each other. In some embodiments, a Discrete Fourier Transform and specially tailored filters are used to improve on the suppression of spurious peaks and to enhance gathering small features together into nearby large ones.

Returning to FIG. 5, at processing block 512, a rising and falling edge detector is applied to the moving average filter output signal to identify the largest reasonably contiguous text segment. In one embodiment, the rising and falling edge detector uses a threshold to locate the largest reasonably contiguous text segment. The width of the largest reasonably contiguous text segment depends on the value of the threshold. That is, when the threshold is lowered, the probability of multiple peaks rising fully above the threshold increases (i.e., it is more likely that the falling edge of one peak and the rising edge of the next peak never cross the threshold). As a result, a larger block of text is deemed contiguous. As the threshold is increased, the probability of multiple peaks rising fully above the threshold decreases (i.e., it is more likely that the falling edge of one peak and the rising edge of the next peak will cross the threshold), resulting in a smaller contiguous text segment.

Referring to FIG. 10, the detector scans the moving average output from left to right looking for a rising edge followed by a falling edge using threshold T. The distance between point (e.g., point A) at which the rising edge reaches threshold T and the point (e.g., point B) at which the falling edge reaches threshold T is calculated to determine the size of the text segment being scanned. Further, the largest text segment is identified.

Returning to FIG. 5, in one embodiment, the operations described with references to processing blocks 508, 510 and 512 are performed concurrently. In one embodiment, the median filtering is performed with an insignificant delay (e.g., the delay of Wm/2 explained above).

Further, at processing block 514, the content of the largest reasonably contiguous text segment is coded in a mobile device markup language for display on the mobile device.

Figure 11:
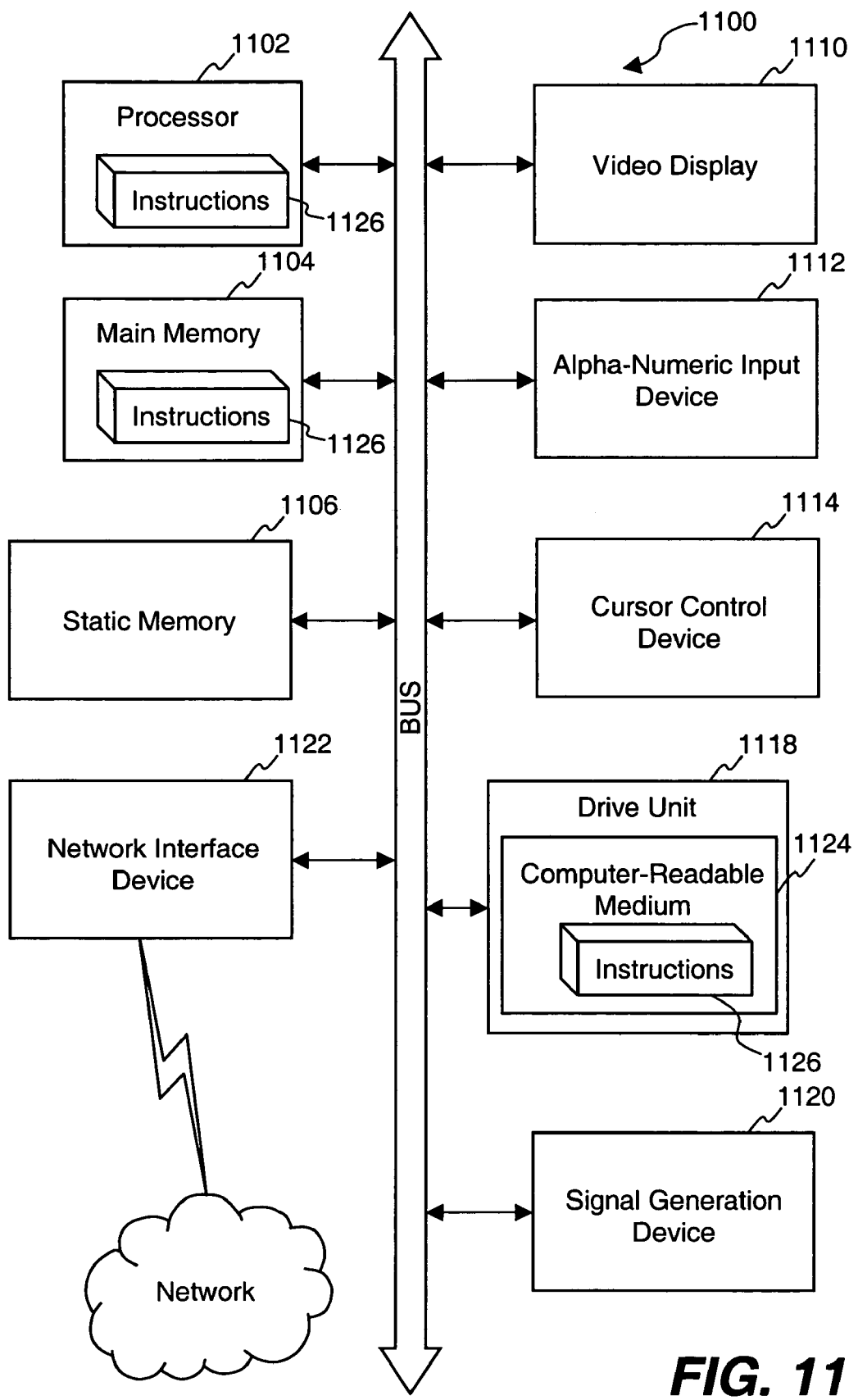
FIG. 11 is a block diagram of one embodiment of a computer system.

FIG. 11 shows a diagrammatic representation of machine in the exemplary form of a computer system 1100 within which a set of instructions, for causing the machine to perform any one of the processes discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1100 includes one or more processors 1102, a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alpha-numeric input device 1112 (e.g. a keyboard), a cursor control device 1114 (e.g. a mouse), a disk drive unit 1116, a signal generation device 1120 (e.g., a speaker) and a network interface device 1122.

The disk drive unit 1116 includes a computer-readable medium 1124 on which is stored a set of instructions (i.e., software) 1126 embodying any one, or all, of the methodologies described above. The software 1126 is also shown to reside, completely or at least partially, within the main memory 1104 and/or within the processor 1102. The software 1126 may further be transmitted or received via the network interface device 1122. For the purposes of this specification, the term computer-readable medium" shall be taken to include any medium that is capable of storing or encoding a sequence of instructions for execution by a machine and that cause the machine to perform any one of the methodologies of the present invention. The term "computer-readable medium" shall accordingly be taken to included, but not be limited to, solid-state memories, optical and magnetic disks, and carrier wave signals.

Thus, a method and apparatus for transforming web pages into pages viewable on mobile devices have been described.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method for transforming a hypermedia document containing main content and auxiliary data, the method comprising:

converting the hypermedia document into a string containing a plurality of first values and a plurality of second values, the plurality of first values replacing a plurality of formatting code segments within the hypermedia document and the plurality of second values replacing a plurality of text segments within the hypermedia document;

applying a low-pass filter to the string containing the plurality of first values and the plurality of second values; and determining a location of the main content within the hypermedia document using an output of the low-pass filter.

2. The method of claim 1 further comprising:
   coding the main content in a mobile device language for display on a mobile device.

3. The method of claim 1, wherein the hypermedia document is a file written in any one of a hypertext markup language (HTML), a dynamic HTML, an extensible HTML (XHTML), an extensible markup language (XML), JavaScript, and Visual Basic (VB) script.

4. The method of claim 1, wherein converting the hypermedia document further comprises:

parsing the hypermedia document to identify the plurality of formatting code segments and the plurality of text segments within the hypermedia document;

assigning a first value to each character within the plurality of formatting code segments; and assigning a second value to each character within the plurality of text segments.

5. The method of claim 4 further comprising truncating a length of one of the plurality of formatting code segments when the length of said one of the plurality of formatting code segments exceeds a threshold tag length value.

6. The method of claim 1, wherein each of the plurality of first values is equal to zero.

7. The method of claim 1, wherein each of the plurality of second values is equal to one.

8. The method of claim 1, wherein the low-pass filter is a moving average filter.

9. The method of claim 8, wherein the output of the low-pass filter represents a distribution of text density over the hypermedia document.

10. The method of claim 9, wherein determining the location of the main content further comprises:

searching an output of the low-pass filter to find a position of a central peak corresponding to the highest text density within the hypermedia document; and determining a starting position of a high text density area and an ending position of the high text density area using the position of the central peak and a threshold text density value.

11. The method of claim 10, wherein the threshold text density value is determined empirically.

12. The method of claim 1 further comprising:
   varying the second value for one of the plurality of text segments based upon a weight associated with said one of the plurality of text segments.

13. The method of claim 1, wherein applying the low-pass filter further comprises:

applying a median filter to the string containing the plurality of first values and the plurality of second values to suppress high frequency signal oscillations associated with the string; and applying a moving average filter to an output of the median filter to combine a plurality of closely spaced text segments contained in the output of the median filter into a set of larger text segments.

14. The method of claim 13, wherein determining the location of the main content further comprises:
applying a rising and falling edge detector to an output of the median filter to identify the largest reasonably contiguous text segment within the set of larger segments.

15. The method of claim 14, wherein the largest reasonably contiguous text segment is identified using a threshold text value.

16. A computer-implemented apparatus for transforming a hypermedia document containing main content and auxiliary data, the apparatus comprising:
a converter to convert the hypermedia document into a string containing a plurality of first values and a plurality of second values, the plurality of first values replacing a plurality of formatting code segments within the hypermedia document and the plurality of second values replacing a plurality of text segments within the hypermedia document;
a low-pass filter to apply to the string containing the plurality of first values and the plurality of second values; and
a location calculator to determine a location of the main content within the hypermedia document using an output of the low-pass filter.

17. The apparatus of claim 16 further comprising:
an encoder to code the main content in a mobile device language for display on a mobile device.

18. The apparatus of claim 16, wherein the hypermedia document is a file written in any one of a hypertext markup language (HTML), a dynamic HTML, an extensible HTML (XHTML), an extensible markup language (XML), JavaScript, and Visual Basic (VB) script.

19. The apparatus of claim 16 further comprising a parser to identify the plurality of formatting code segments and the plurality of text segments within the hypermedia document.

20. The apparatus of claim 16 wherein the converter is to convert the hypermedia document by assigning a first value to each character within the plurality of formatting code segments and assigning a second value to each character within the plurality of text segments.

21. The apparatus of claim 20 wherein the converter is to truncate a length of one of the plurality of formatting code segments when the length of said one of the plurality of formatting code segments exceeds a threshold tag length value.

22. The apparatus of claim 16, wherein each of the plurality of first values is equal to zero.

23. The apparatus of claim 16, wherein each of the plurality of second values is equal to one.

24. The apparatus of claim 16, wherein the low-pass filter is a moving average filter.

25. The apparatus of claim 24, wherein the output of the low-pass filter represents a distribution of text density over the hypermedia document.

26. The apparatus of claim 25, wherein the location calculator is to determine the location of the main content by searching an output of the low-pass filter to find a position of a central peak corresponding to the highest text density within the hypermedia document, and by determining a starting position of a high text density area and an ending position of the high text density area using the position of the central peak and a threshold text density value.

27. The apparatus of claim 16 wherein the converter is to vary the second value for one of the plurality of text segments based upon a weight associated with said one of the plurality of text segments.

28. The apparatus of claim 16, wherein the low-pass filter further comprises:
a median filter to be applied to the string containing the plurality of first values and the plurality of second values to suppress high frequency signal oscillations associated with the string; and
a moving average filter to be applied to an output of the median filter to combine a plurality of closely spaced text segments contained in the output of the median filter into a set of larger text segments.

29. The apparatus of claim 28, wherein the location calculator is to determine the location of the main content by applying a rising and falling edge detector to an output of the median filter to identify the largest reasonably contiguous text segment within the set of larger segments.

30. The apparatus of claim 29, wherein the location calculator is to identify the largest reasonably contiguous text segment using a threshold text value.

31. A medium readable by a machine, the medium having stored thereon a sequence of instructions which, when executed by the machine, cause the machine to:
convert the hypermedia document into a string containing a plurality of first values and a plurality of second values, the plurality of first values replacing a plurality of formatting code segments within the hypermedia document and the plurality of second values replacing a plurality of text segments within the hypermedia document;
apply a low-pass filter to the string containing the plurality of first values and the plurality of second values; and
determine a location of the main content within the hypermedia document using a low-pass filter output.

32. A method for transforming a web page containing main content and auxiliary data, the method comprising:
converting the web page into a string containing a plurality of first values and a plurality of second values, the plurality of first values corresponding to a plurality of formatting code segments within the web page and the plurality of second values corresponding to a plurality of text segments within the web page;
applying a moving average filter to the string containing the plurality of first values and the plurality of second values to generate an output representing a distribution of text density over the web page;
searching the output of the moving average filter to find a position of a central peak corresponding to the highest text density within the web page;
determining a starting position of a high text density area and an ending position of the high text density area using the position of the central peak and a threshold text density value to determine a location of the main content within the web page; and
coding the main content in a mobile device language for display on a mobile device.

33. The method of claim 32 further comprising truncating a length of one of the plurality of formatting code segments when the length of said one of the plurality of formatting code segments exceeds a threshold tag length value.

34. The method of claim 32, wherein each of the plurality of first values is equal to zero and each of the plurality of second values is equal to one.

35. The method of claim 32 further comprising:
varying the second value for one of the plurality of text segments based upon a weight associated with said one of the plurality of text segments.

36. A method for transforming a web page containing main content and auxiliary data, the method comprising:
- converting the web page into a string containing a plurality of first values and a plurality of second values, the plurality of first values corresponding to a plurality of formatting code segments within the web page and the plurality of second values corresponding to a plurality of text segments within the web page;
- applying a median filter to the string containing the plurality of first values and the plurality of second values to suppress high frequency signal oscillations associated with the string;
- applying a moving average filter to an output of the median filter to combine a plurality of closely spaced text segments contained in the output of the median filter into a set of larger text segments;
- applying a rising and falling edge detector to an output of the median filter to identify the largest reasonably contiguous text segment within the set of larger segments using a threshold text value, the largest reasonably contiguous text segment corresponding to the main content of the web page; and
- coding the main content in a mobile device language for display on a mobile device.

37. The method of claim 36 further comprising truncating a length of one of the plurality of formatting code segments when the length of said one of the plurality of formatting code segments exceeds a threshold tag length value.

38. The method of claim 36, wherein each of the plurality of first values is equal to zero and each of the plurality of second values is equal to one.

39. The method of claim 36 further comprising:
- varying the second value for one of the plurality of text segments based upon a weight associated with said one of the plurality of text segments.

* * * * *